United States Patent [19]
Good et al.

[11] 3,785,680
[45] Jan. 15, 1974

[54] SWAY CONTROL DEVICE FOR CONNECTION BETWEEN A TRAILER AND TOWING VEHICLES

[75] Inventors: Arthur L. Good; Robert P. Reese, both of Elkhart, Ind.

[73] Assignee: Reese Products, Inc., Elkhart, Ind.

[22] Filed: Jan. 26, 1973

[21] Appl. No.: 327,081

[52] U.S. Cl. ............................ 280/446 B, 280/456
[51] Int. Cl. ............................................. B60d 1/00
[58] Field of Search ..................... 280/446 B, 446 R

[56] References Cited
UNITED STATES PATENTS

| | | | |
|---|---|---|---|
| 3,294,421 | 12/1966 | Mathisen | 280/446 B |
| 3,471,170 | 10/1969 | Rendessy | 280/446 B |
| 3,502,351 | 3/1970 | Gray | 280/446 B |
| 3,635,496 | 1/1972 | Hedgepeth | 280/446 B |

FOREIGN PATENTS OR APPLICATIONS

| | | | |
|---|---|---|---|
| 695,898 | 9/1940 | Germany | 280/446 B |
| 840,845 | 7/1960 | Great Britain | 280/446 B |

*Primary Examiner*—Leo Friaglia
*Attorney*—James D. Hall

[57] ABSTRACT

A control device usable for reducing sway between a trailer and towing vehicle. The control device includes a friction disk disposed between a bracket connected to one of the trailer and towing vehicle and a pivot arm connected to the other of the trailer and towing vehicle. The disk is compressed between the bracket and arm by means of an adjustable securement part.

10 Claims, 12 Drawing Figures

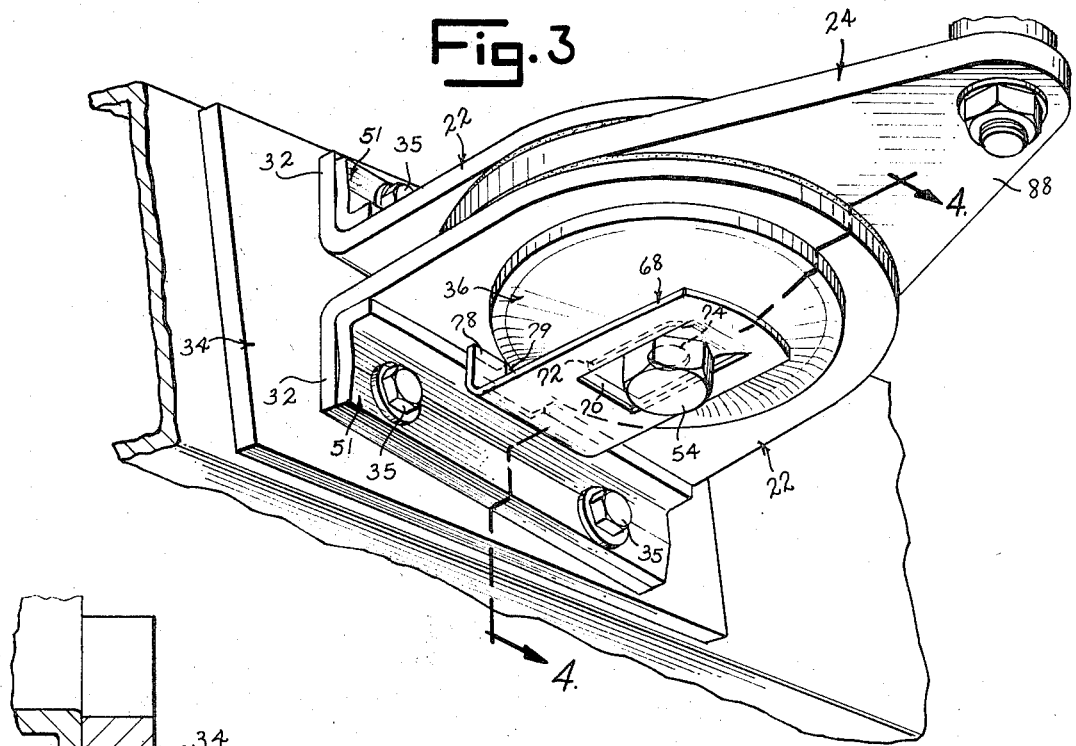
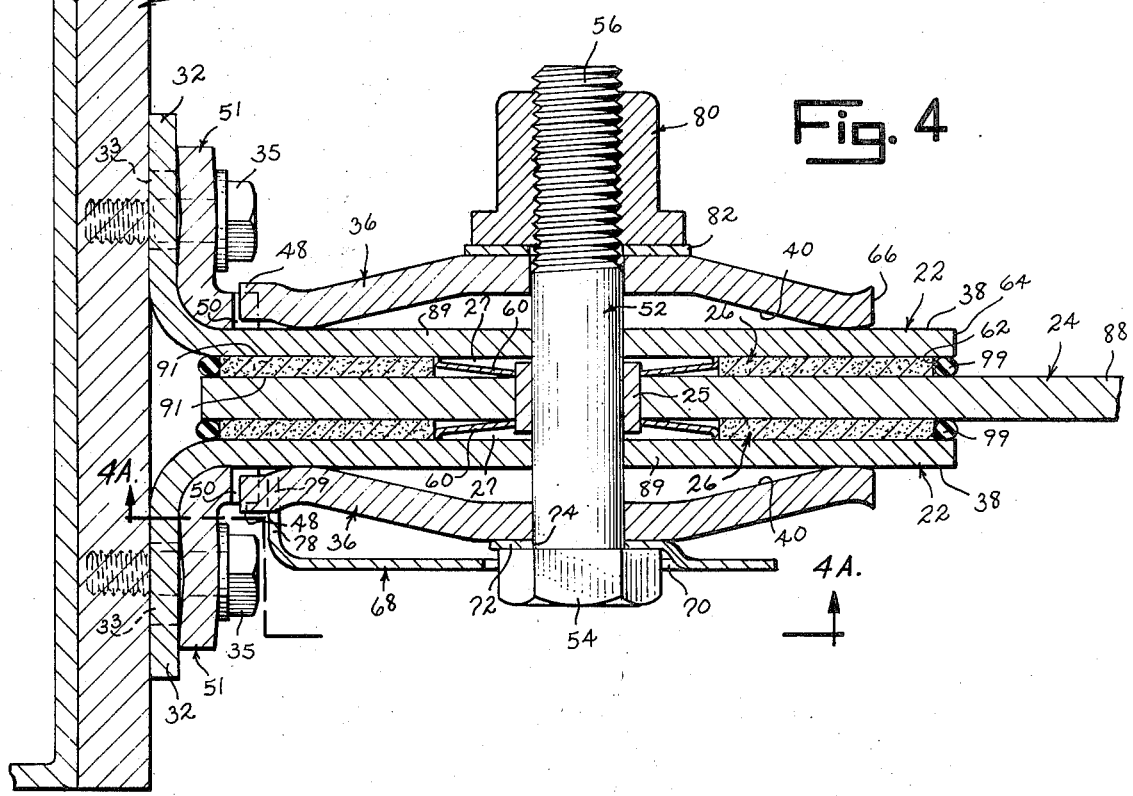

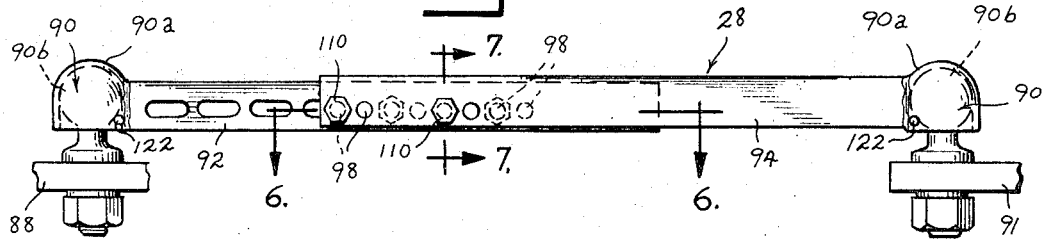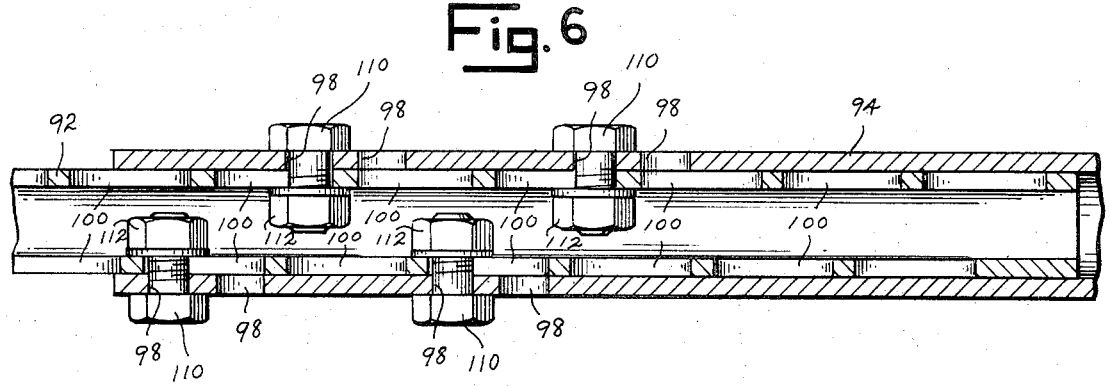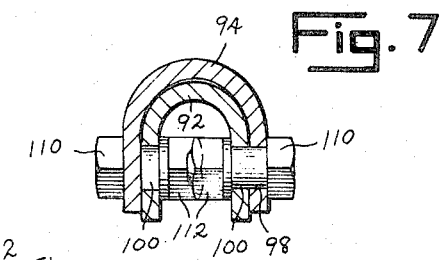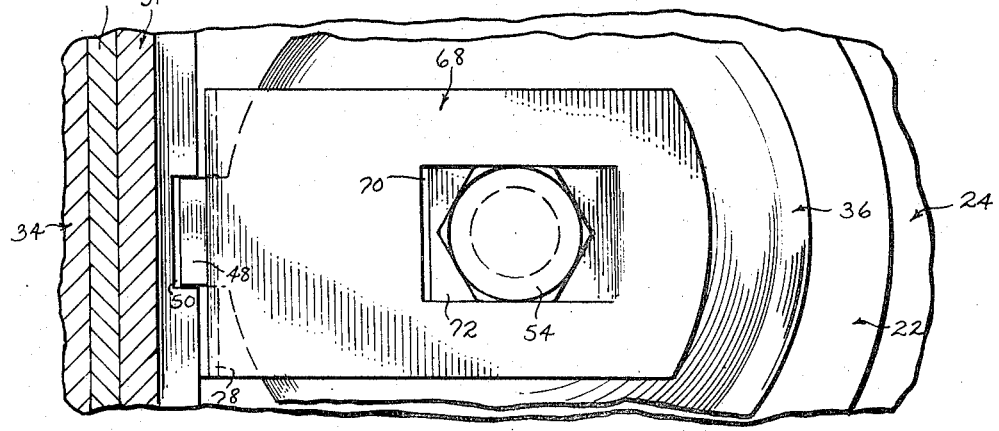

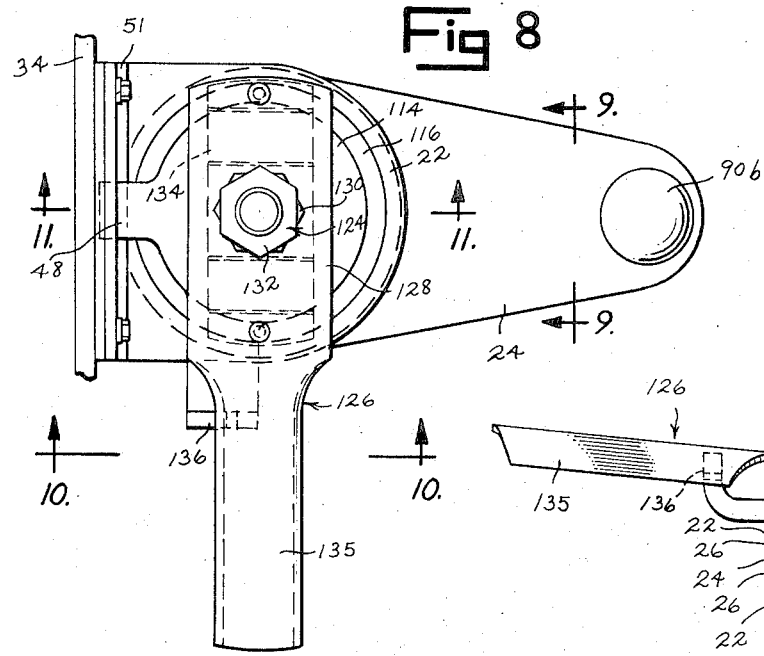
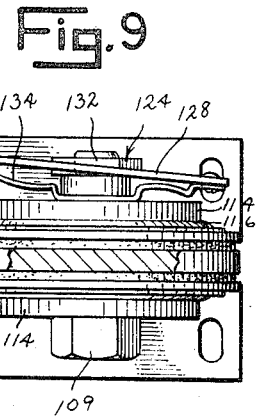
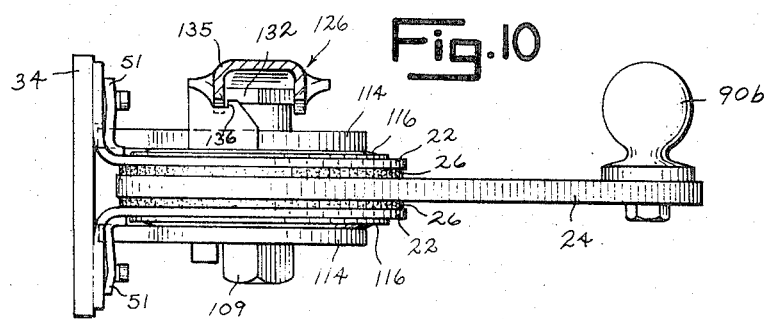
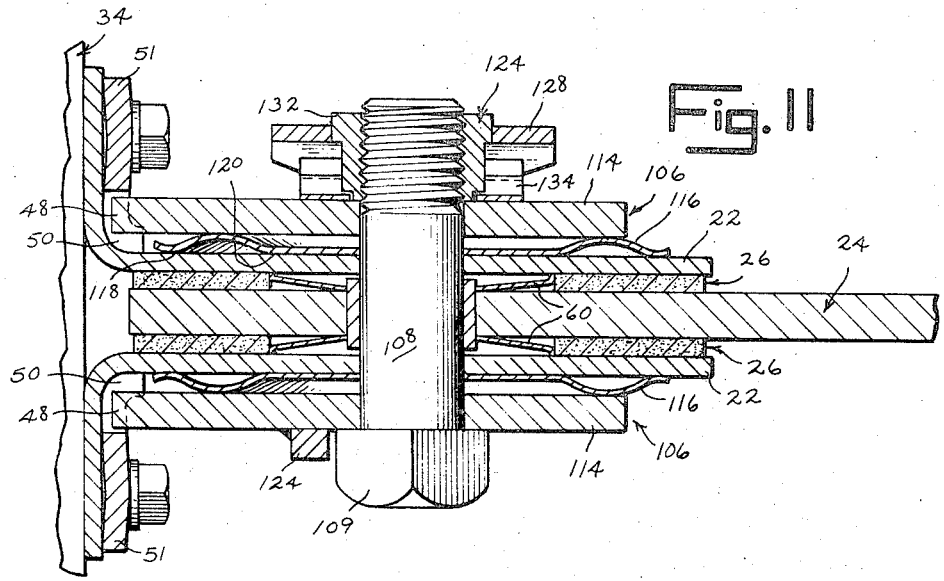

3,785,680

SWAY CONTROL DEVICE FOR CONNECTION BETWEEN A TRAILER AND TOWING VEHICLES

SUMMARY OF THE INVENTION

This invention relates to an improved control device for connection between a trailer and towing vehicle and will have specific application to means for controlling the sway between the trailer and towing vehicle.

The disk-type sway control device of this invention has a friction pad disposed between a bracket connected to either the trailer or the towing vehicle and an arm pivotally connected to the other of the trailer and towing vehicle. A securement means extends through the bracket and arm and serves to cause the friction pad to be compressed between the arm and bracket. The securement means is adjustable so as to regulate the amount of compressive force applied to the arm and pad, and thus vary the extent of the sway control between the trailer and towing vehicle. An annular shaped pressure washer means is provided between the securement means and bracket. This pressure washer means is anchored against rotation to the bracket and positioned over the friction pad. The friction pad is open in the center and is of a flattened ring configuration. The securement means is constructed so as to permit the trailer user to relieve the compressive force between the friction pad, the bracket and arm, such as when coupling or uncoupling the towing vehicle to or from the trailer.

Accordingly, it is an object of this invention to provide a friction device for energy dissipation between two relative moving components.

Another object of this invention is to provide a control device for regulating pivotal movement between a trailer and towing vehicle.

It is another object of this invention to provide an improved sway control device for a towed vehicle.

It is another object of this invention to provide a friction sway control device for a trailer in which the degree of control between the trailer and towing vehicle is regulated by an adjustment means.

Still another object of this invention is to provide a disk type sway control device for a towed vehicle having improved means for regulating the amount of frictional force between the pivotal components of the device.

Still another object of this invention is to provide a disk type sway control device which is for a trailer and which is of economical construction.

Other objects of this invention will become apparent upon a reading of the invention's description.

BRIEF DESCRIPTION OF THE DRAWINGS

FIG. 3 is a perspective view of the bracket plate and pivot arm components of the control device illustrated in FIG. 1 and as viewed from below.

FIG. 4 is a fragmentary sectional view taken along line 4—4 of FIG. 3.

FIG. 4A is a fragmentary view as seen from line 4A—4A in FIG. 4.

FIG. 5 is a fragmentary view of the linkage system of the control device as seen from line 5—5 of FIG. 2.

FIG. 6 is a fragmentary sectional view taken along line 6—6 of FIG. 5.

FIG. 7 is a cross sectional view taken along line 7—7 of FIG. 5.

FIG. 8 is a top plan view of another embodiment of the control device of this invention.

FIG. 9 is a sectional view taken along line 9—9 of FIG. 8.

FIG. 10 is a sectional view taken along line 10—10 of FIG. 8.

FIG. 11 is a fragmentary sectional view taken along line 11—11 of FIG. 8.

DESCRIPTION OF THE PREFERRED EMBODIMENTS

Figure 1:
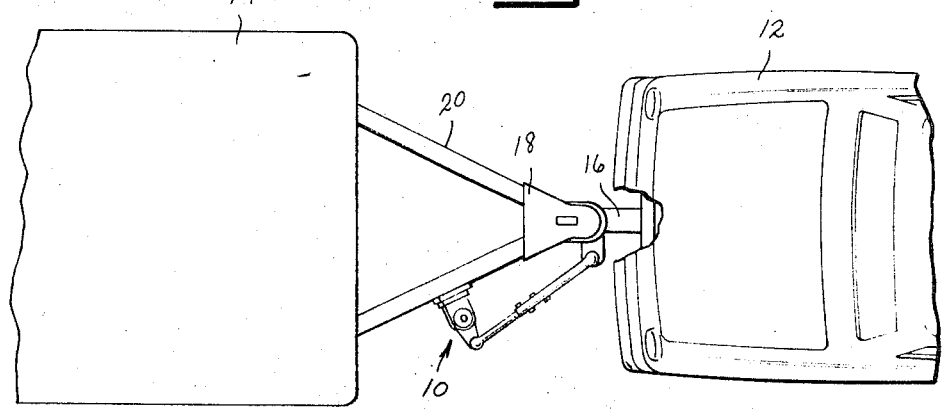
FIG. 1 is a top plan view of a trailer and towing vehicle showing one embodiment of the control device of of this invention connected therebetween.

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

The control device illustrated in FIGS. 1-7 is designated by the reference numeral 10 and is shown connected between towing vehicle 12 and trailer 14. Vehicle 12 carries a suitable ball mount 16. A coupler 18 is secured to frame 20 of trailer 14. Ball mount 16 and coupler 18 form the components of a hitch which is utilized to connect trailer 14 to towing vehicle 12 and which may be of any of a variety of standard commercially available constructions.

Control device 10 includes a pair of brackets 22 to which an arm 24 is pivotally connected, friction disks 26 disposed between the brackets and pivot arm, and a rigid link member 28 which is connected at one end to arm 24. Brackets 22 include outturned flanges 32 having slotted apertures 33 formed therein for securing the brackets to a mounting plate 34. Each friction disk 26 is of a flattened circular washer-like configuration and has a central opening 27 formed therein. A pressure washer 36 is positioned against the outer face 38 of each bracket 22. Pressure washers 36 are conically shaped and have their concave faces 40 confronting the outer faces 38 of the brackets. Each pressure washer 36 includes a tab 48 which extends outwardly from the circumferential edge of the washer and which projects with slight clearance into an opening 50 formed in the lower flange of an angular reinforcement part 51. Each reinforcement part 51 is positioned across a flange 32 of a bracket 22. Bolts 35 extend through parts 51 and apertures 33 in the brackets 22 and serve to secure the reinforcement parts and the brackets to the mounting plate. Reinforcement parts 51 strengthen brackets 22 at the corners of flange 32 and serve to prevent the loosening of bolts 35 during towing operations.

Brackets 22, arm 24 and pressure washers 36 have registering openings formed therein. A securement member 52 extends with slight clearance through the registering openings in the brackets, arm and pressure washers, and through openings 27 in friction disks 26, one end of securement member 52 is formed into an enlarged head 54 and the opposite end 56 of the member is threaded. To reduce wear between arm 24 and securement member 52, the center opening in the arm is formed by a bushing 25. A locating washer 60 is fitted over securement member 52 and into opening 27 of each friction disk 26. Washers 60 axially align disks 26 relative to securement member 52 and the pivot axis of arm 24. The outer peripheral edges 62 of disks 26 are preferably just slightly inwardly spaced from the peripheral edges 64 of brackets 22 and terminate outwardly of the annular peripheral edges 66 of pressure washers 36.

Figure 2:
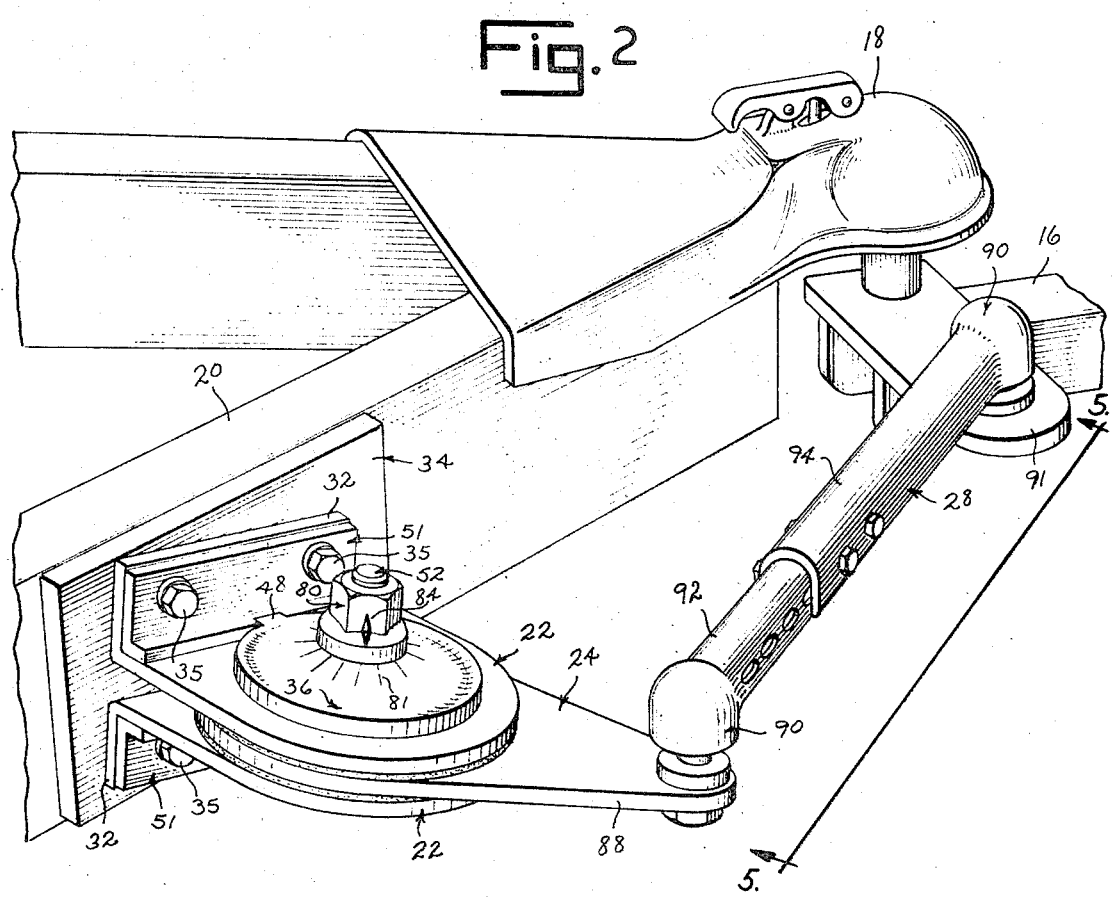
FIG. 2 is a perspective view in fragmentary form showing the control device illustrated in FIG. 1.

Securement member 52, which is of a bolt design, is secured against rotative movement relative to brackets 22 by means of a holder part 68. Holder part 68 has an elongated slot 70 formed therein and an offset integral plate section 72. Plate section 72 includes an aperture 74 which is aligned with slot 70 and through which the stem of the securement member 52 is inserted with the head 54 of the securement member fitting nonrotatively within slot 70. One marginal edge portion of holder part 68 is provided with an inturned flange 78 having a slot 79 formed therein. Tab 48 of the adjacent pressure washer 36 is received within opening 78 in the holder part and seves to prevent rotation of the holder part relative to the pressure washer and its associated bracket 22. A torque nut 80 is turned onto threaded end 56 of securement member 52 and is brought to bear against an underlying bearing washer 82 and adjacent pressure washer 36. A tightening of nut 80 causes pressure washers 36 to bear against brackets 22 which flex and compress the friction pads against arm 24. As shown in FIG. 2, the upper pressure washer 36 carries radially disposed markings 81, and nut 80 carries an indicator marker 84. Markings 81 and marker 84 allow the user of the control device note the position of the torque nut for a specific sway control force and to reposition the nut and reset the sway control force after recoupling the trailer to the towing vehicle. By anchoring pressure washers 36, a source of consistent force application is applied to brackets 22, markings 81 are fixedly located, and the chance of nut 80 becoming loosened during towing operations is minimized.

Mounting plate 34 is preferably secured to the frame 20 of trailer 14 in a position rearwardly spaced from coupler 18. Extended part 88 of arm 24 is connected by link member 28 to towing vehicle 12. It is to be understood that in some constructions of this invention it may be preferable to connect mounting plate 34 to the towing vehicle and link 28 to the trailer. Link 28 is of a rigid construction and is pivotally connected at each of its ends by means of ball and socket connections 90 to arm part 88 and a mounting part 91 secured to ball mount 16. With the control device so connected between vehicle 12 and trailer 14, any lateral pivotal movement between the vehicle and trailer will cause pivotal movement of arm 24 about securement member 52 between brackets 22.

Link 28 is preferably adjustable to permit the control device to accommodate vehicles and trailers of varying sizes. Link 28 is formed of an inner inverted U-shaped channel part 92 which is telescopically fitted within an outer inverted U-shaped channel part 94. The outer ends of channel parts 92 and 94 carry a socket portion 90a. Each side of outer channel part 94 has a plurality of longitudinally spaced openings 98 formed therein. Openings 98 are positioned in spaced pairs along each side of the channel part with the pairs being disposed in a staggered relationship from one side to the other of the part, as best illustrated in FIG. 6. A plurality of elongated longitudinally spaced slots 100 are formed in the sides of inner channel part 92. Slots 100 are equally spaced apart along each side of channel part 92 and are disposed along one such side in an overlapping staggered relationship relative to the slots 100 in the opposite side of the channel part. Openings 98 and slots 100 are positioned so as to prevent a securement bolt from being inserted entirely across the inner and outer channel parts 92 and 94 and which upon tightening could cause an inward flexing of the channel part sides, resulting in a bending and binding of the parts. To secure inner channel part 92 to outer channel part 94, at least two and preferably four short securement bolts 110 are inserted through registering openings 98 and slots 100 and tightened against the channel parts by nuts 112. By this unique arrangement of openings 98 and slots 100 in channel parts 92 and 94, link 28 may be adjusted for any suitable length without the utilization of securement bolts which extend entirely through the link. Extended part 88 of arm 24 carries a ball 90b which fits into the socket portion 90a of inner channel part 92. A second ball 90b is carried upon mounting part 91 and is fitted within socket portion 90a of outer channel part 94. Each socket portion 90a carries a suitable transversely oriented lock pin 122 which prevents ball 90b from being separated from the socket portion during the towing operation.

To facilitate the freeing of arm 24 from the compressive force of brackets 22 upon loosening of nut 80, such as when uncoupling the trailer from the towing vehicle, the disk engaging plate portion 89 of each bracket 22 is formed at an 87° or 88° angle to flange 32 of the bracket so that the bracket plate portions will diverge when secured to the mounting plate with securement member nut 80 loosened. This allows brackets 22 to spring slightly away from the innerface of the plate part of arm 24 so as to release the arm for relatively free pivotal movement about securement member 52. Upon tightening nut 80, brackets 22 will be pulled together to urge disks 26 against arm 24. Each friction disk 26 is preferably glued or otherwise secured, such as by staking, to a bracket 22 to prevent its pivotal movement relative to the bracket. By providing the friction disks 26 with a flattened washer-like configuration and by designing each pressure disk 26 with annular pressure contact areas 91, the friction disks can be economically made and the areas of friction contact between the disks and brackets 22 and arm 24 are radially spaced from the pivot axis of the arm so as to maximize the resistive force or movement exerted by the disks for a given disk size. O-rings 99 can be positioned between brackets 22 and arm 24 at the outer periphery of friction disks 26 to prevent water and dirt from getting between the disks and the arm.

In FIGS. 8–11 another embodiment of the sway control device of this invention is shown. The construction of this type sway control device is similar to the construction of the device shown in FIGS. 1–7 with the exception of the type of pressure washer 106 and the type of securement member 108 for applying a compressive force to the friction disks 26 and arm 24.

Each pressure washer 106 is of a two-part construction which includes a plate part 114 and a washer part 116. Plate part 114 includes a tab 48 which projects with slight clearance into opening 50 formed in the lower flange of the reinforcement part 51 to prevent the plate part from turning relative to the adjacent bracket 22. Washer part 116 is of a thin-walled construction and has a first annular pressure contact area 118 and a concentric second annular pressure contact area 120. Under light trailer loads, only contact area 118 will be brought to bear against the underlying bracket 22. Under heavy trailer loads, tightening of the securement member 108 will further flex the washer part and cause both contact areas 118 and 120 to bear against the underlying bracket.

Securement member 108 extends through plate parts 114, washer parts 116, brackets 22, friction disks 26, and arm 24, and serves as the pivot for movement of the arm. The head 109 at one end of the securement member is locked against rotation by a stop 124 welded to the lower plate part 114. The opposite end of the securement member is threaded and receives a nut 124 which bears against the upper plate part 114. A handle 126 is secured by nut 124 to the control device for rotation about the securement member 108. Handle 126 includes a rigid part 128 which has a multi-sided opening 130 therein adapted to engage the head 132 of nut 124 in a plurality of angular positions for the purpose of tightening or loosening the nut. A flexible part 134 is secured to rigid part 128 of the handle and is rotatably held against upper plate part 114 by nut 124. Flexible part 134 of the handle allows rigid part 128 to be depressed below the level of head 132 of the nut so as to allow for the turning of the nut by a suitable wrench to initially set the compressive force exerted upon arm 24. Part 134 also allows grip 135 of the rigid handle part 128 to be shifted upwardly and cammed into a lock 136 carried by upper plate part 114 with nut head 132 lockingly fitting into handle opening 130 as shown in FIGS. 8-11. When it is desired to loosen nut 124 and thus relieve the compressive force exerted upon arm 24, such as when uncoupling the trailer, grip 134 of handle 126 is lifted and freed from lock 136. The handle is then rotated for part of a turn with nut head 132 being lockingly fitted within the handle opening 130 and turned with the handle. To retighten nut 124, handle 126 is reverse turned until it engages lock 136 and is held thereby, causing the same compressive force to be applied to arm 24. By anchoring plate parts 114, a source of consistent force application is applied to brackets 22 and the chance of nut 124 coming loosened during towing operations is minimized should the hitch user forget to engage handle 126 with lock 136.

In both embodiments of this invention, the slotted apertures 33 in brackets 22 allow for the brackets to be moved closer together to compensate for wear of friction disks 26. Also the sway control devices can be mounted to a straight-tongue trailer frame as well as the A-frame 20 shown in the drawings. Brackets 22 are preferably slightly turned, as best shown in FIG. 2, when secured to the trailer frame to allow link 28 to swing over the upper bracket 22 and pressure washer 36 during a maximum turn between trailer and towing vehicle.

It is to be understood that the invention is not to be limited to the details herein given but may be modified within the scope of the appended claims.

What we claim is:

1. A control device for connection between a trailer and towing vehicle, said control device including a bracket which includes a plate part having an inner face, means connecting said bracket to one of said trailer and towing vehicle whereby said bracket plate part is spaced from said one trailer or vehicle, an arm, said arm including a plate part having an inner face and an extended part, said arm and bracket plate parts being positioned in an opposed relationship with said inner faces thereof confronting one another, a disk of friction material disposed between said arm and bracket inner faces, said bracket and arm parts each having an aperture formed therein, said bracket and arm plate part apertures extending through the inner faces of the plate parts and being aligned, adjustable securement means extending through said apertures and causing said bracket and arm plate parts to be drawn together and said friction disk compressed therebetween, said arm being pivotable relative to said bracket plate part about said securement means, linkage means having first and second ends secured between said arm extended part and the other of said trailer and towing vehicle for causing pivotal movement between said bracket and arm upon pivotal movement of said trailer relative to said towing vehicle, the improvement wherein said securement means includes a shank extending through said bracket and arm plate part apertures and a tightening nut rotatably carried upon said shank, said nut located at the opposite side of said friction disk from said arm and being spaced from said bracket plate part, a pressure washer means disposed between said nut and bracket plate part, said pressure washer means including an annular bracket-contact area substantially concentric with said shank and engaging said bracket plate part over said friction disk radially spaced from said shank, means anchoring said pressure washer means to said bracket, said nut being turned onto said shank and against said pressure washer means to cause said compression of the friction disk between said bracket and arm plate parts.

2. The control device of claim 1 wherein said friction disk has a central opening therein, said securement means shank extending with substantial clearance through said friction disk opening, a locating washer means fitted over said securement means shank and into said friction disk central opening to coaxially locate said disk relative to said shank.

3. The control device of claim 2 and means for securing said friction disk against rotation relative to said bracket plate part.

4. The control device of claim 1 wherein there are two of said brackets, each said bracket secured to said one of the trailer or towing vehicle, the plate parts of said brackets being positioned on opposite sides of said arm plate part, a said friction disk located between said arm plate part and each bracket plate part, said apertures in the arm and bracket plates being aligned, said securement means shaft extending through said apertures, said securement means including a head formed at one end of said shank, one said pressure washer means disposed between said head and one of said bracket plate parts and another said pressure washer means disposed between said nut and other of said bracket plate parts, means anchoring said pressure washer means to said brackets, each bracket including a flange angularly disposed relative to its plate part, said brackets being secured to said one trailer or towing vehicle at said flanges, reinforcement means constituting a part of said bracket located between the flange and plate part of each bracket for the purpose of strengthening the plate part against flexure in a direction opposite to the direction of force exerted by the securement means to compress the friction disks between said arm and bracket plate parts.

5. The control device of claim 4 wherein said reinforcement means is an angle iron secured to said bracket flange and having a foot part positioned against said bracket plate part.

6. The control device of claim 5 wherein the foot part of each reinforcing means has a notched opening formed therein, each pressure washer means including a tab part fitting within a said notched opening and thereby preventing said washer means from rotating relative to said bracket.

7. The control device of claim 6 and including holder means engaging said securement means for locking said securement means shaft against rotation relative to said brackets, said holder means including parts lockingly engaging the head of said securement means and the tab of one of said pressure washer means.

8. The control device of claim 4 wherein the peripheral outer edges of said friction disk are spaced inwardly from the peripheral edges of said bracket and arm plate parts, an annular moisture and dirt seal means encircling at least one of said friction disks at its outer peripheral edge in sealing engagement with the arm and bracket plate parts in contact with said one disk.

9. The control device of claim 4 wherein each pressure washer means includes a washer part in contact with a said bracket and includes a plate part overlying and in contact with said washer part, said washer part having first and second annular bracket-contact areas radially spaced from said securement means shaft, said second annular bracket-contact area being outwardly spaced from said first annular bracket-contact area, said washer part being concave wherein only said first annular bracket-contact area will be pressed into contact with said bracket plate part upon initial tightening of said securement means and both said contact areas will be pressed into contact with the bracket plate part upon additional tightening of the securement means.

10. The control device of claim 1 wherein said linkage means comprises first and second telescopically interfitting members, said first member having opposed sides with pairs of longitudinally spaced openings therein, each pair of openings in one side of the first member being offset from the pairs of openings in the other side of the first member so that no two pairs of openings are aligned, said second member having opposed sides with longitudinally spaced slots therein, said slots being equally spaced apart on each side of the second member with the slots on one such side being offset by one-half of a slot from the slots on the other such side of the second member, said first and second members being extended to a selected length with at least one opening and one slot in each side of said members being aligned and receiving a nut and bolt securement means.

* * * * *